(12) United States Patent
Puiu

(10) Patent No.: US 7,278,943 B2
(45) Date of Patent: *Oct. 9, 2007

(54) POWER TRANSMISSION DEVICE WITH ELECTROHYDRAULIC CLUTCH ACTUATOR

(75) Inventor: Dumitru Puiu, Sterling Heights, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/274,765

(22) Filed: Nov. 15, 2005

(65) Prior Publication Data

US 2006/0065070 A1    Mar. 30, 2006

Related U.S. Application Data

(63) Continuation of application No. 10/763,110, filed on Jan. 22, 2004, now Pat. No. 7,004,873.

(51) Int. Cl.
*F16H 48/20* (2006.01)

(52) U.S. Cl. ....................................................... 475/86

(58) Field of Classification Search .................. 192/35, 192/70.23, 85 AA, 93 A; 180/249, 250; 475/86, 145, 146

See application file for complete search history.

(56) References Cited

U.S. PATENT DOCUMENTS

| 4,862,769 | A  | 9/1989  | Koga et al.       |
|-----------|----|---------|-------------------|
| 4,895,236 | A  | 1/1990  | Sakakibara et al. |
| 5,119,298 | A  | 6/1992  | Naito             |
| 5,224,906 | A  | 7/1993  | Sturm             |
| 5,323,871 | A  | 6/1994  | Wilson et al.     |
| 5,407,024 | A  | 4/1995  | Watson et al.     |
| 5,423,235 | A  | 6/1995  | Botterill et al.  |
| 6,158,561 | A  | 12/2000 | Sakai et al.      |
| 6,478,708 | B2 | 11/2002 | Krisher           |
| 6,520,880 | B1 | 2/2003  | Fukushima et al.  |
| 6,595,338 | B2 | 7/2003  | Bansbach et al.   |
| 6,641,267 | B2 | 11/2003 | Ohishi et al.     |
| 6,691,845 | B2 | 2/2004  | Showalter         |
| 6,945,374 | B2 * | 9/2005 | Puiu ............................ 192/35 |

(Continued)

FOREIGN PATENT DOCUMENTS

JP          62-18117        1/1990

(Continued)

*Primary Examiner*—Dirk Wright
(74) *Attorney, Agent, or Firm*—Harness, Dickey & Pierce, P.L.C.

(57) ABSTRACT

A torque transfer mechanism having a multi-plate friction clutch connecting a pair of rotary members and an electrohydraulic clutch actuator for controlling engagement of the friction clutch. The clutch actuator includes a hydraulic pump, a hydraulically-actuated rotary operator, and a ball ramp mechanism. The hydraulic pump draws low pressure fluid from a sump and delivers high pressure fluid to a series of actuation chambers defined between coaxially aligned first and second components of the rotary operator. The magnitude of the fluid pressure delivered to the actuation chamber controls angular movement of the second component relative to the first component for energizing the ball ramp mechanism. The ball ramp mechanism applies a clutch engagement force on the friction clutch assembly, thereby transferring drive torque from the first rotary member to the second rotary member. A hydraulic control system adaptively regulates the fluid pressure delivered to the actuation chamber.

25 Claims, 14 Drawing Sheets

U.S. PATENT DOCUMENTS

| | | | |
|---|---|---|---|
| 6,948,604 B2 * | 9/2005 | Puiu | 192/35 |
| 6,991,079 B2 * | 1/2006 | Puiu | 192/35 |
| 7,004,873 B2 * | 2/2006 | Puiu | 475/145 |
| 2005/0167223 A1 | 8/2005 | Puiu | |

FOREIGN PATENT DOCUMENTS

| | | |
|---|---|---|
| JP | 63-66927 | 3/1990 |

* cited by examiner

POWER TRANSMISSION DEVICE WITH ELECTROHYDRAULIC CLUTCH ACTUATOR

CROSS-REFERENCE TO RELATED APPLICATIONS

This application is a continuation of U.S. patent application Ser. No. 10/763,110 filed on Jan. 22, 2004, now U.S. Pat. No. 7,004,843.

FIELD OF THE INVENTION

The present invention relates generally to power transfer systems for controlling the distribution of drive torque between the front and rear drivelines of a four-wheel drive vehicle and/or the left and right wheels of an axle assembly. More particularly, the present invention is directed to a power transmission device for use in motor vehicle driveline applications having a torque transfer mechanism equipped with a power-operated clutch actuator that is operable for controlling actuation of a multi-plate friction clutch.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. When the lock-up clutch is released, drive torque is only delivered to the primary driveline for establishing a two-wheel drive mode.

A modern trend in four-wheel drive motor vehicles is to equip the power transmission device with an adaptively controlled transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch assembly. The clutch actuator can be a power-operated device that is actuated in response to electric control signals sent from an electronic controller unit (ECU). The electric control signals are typically based on changes in current operating characteristics of the vehicle (i.e., vehicle speed, interaxle speed difference, acceleration, steering angle, etc.) as detected by various sensors. Thus, such "on-demand" transfer clutch can utilize adaptive control schemes for automatically controlling torque distribution during all types of driving and road conditions. Such adaptively controlled transfer clutches can also be used in association with a center differential operably installed between the primary and secondary drivelines for automatically controlling interaxle slip and torque biasing in a full-time four-wheel drive application.

A large number of adaptively controlled transfer clutches have been developed with an electromechanical clutch actuator that can regulate the amount of drive torque transferred to the secondary driveline as a function of the electric control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force to the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly. As an alternative, the transfer clutch can employ an electric motor and a mechanical drive assembly as the power-operated clutch actuator. For example, U.S. Pat. No. 5,323,871 discloses a transfer clutch equipped with an electric motor that controls rotation of a sector plate which, in turn, controls pivotal movement of a lever arm that is operable for applying the clutch engagement force to the multi-plate clutch assembly. Likewise, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer clutch having an electric motor which drives a reduction gearset for controlling movement of a ball screw operator and a ball-ramp operator which, in turn, apply the clutch engagement force to the clutch assembly.

In contrast to the electro-mechanical clutch actuators discussed previously, it is also well known to equip the transfer clutch with an electro-hydraulic clutch actuator. For example, U.S. Pat. Nos. 4,862,769 and 5,224,906 generally disclose use of an electric motor or solenoid to control the fluid pressure exerted by an apply piston on a multi-plate clutch assembly. In addition, U.S. Pat. No. 6,520,880 discloses a hydraulic actuation system for controlling the fluid pressure supplied to a hydraulic motor arranged which is associated with a differential gear mechanism in a drive axle assembly.

While many adaptive clutch actuation systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads make many systems cost prohibitive for use in most four-wheel drive vehicle applications. In an effort to address these concerns, new technologies are being developed for use in power-operated clutch actuator applications.

SUMMARY OF THE INVENTION

Thus, its is an objective of the present invention to provide a power transmission device for use in a motor vehicle having a torque transfer mechanism equipped with a unique power-operated clutch actuator that is operable to control engagement of a multi-plate clutch assembly.

As a related objective of the present invention, the torque transfer mechanism is well-suited for use in motor vehicle driveline applications to control the transfer of drive torque between first and second rotary members.

According to each preferred embodiment of the present invention, a torque transfer mechanism and a control system are disclosed for adaptively controlling the transfer of drive torque between first and second rotary members in a power transmission device of the type used in motor vehicle driveline applications. The torque transfer mechanism includes a multi-plate friction clutch that is operably disposed between the first and second rotary members, and a clutch actuator for generating and applying a clutch engagement force on the friction clutch. The clutch actuator preferably includes a hydraulic fluid pump, a rotary operator and a ball ramp mechanism. The pump is operable to draw fluid from a fluid source and deliver pressurized fluid through a hydraulic flow control circuit to a plurality of actuation chambers defined between coaxially aligned first and second components of the rotary operator. During operation, the magnitude of the fluid pressure delivered to the actuation chambers controls the angular movement of the second component relative to the first component. Such relative angular movement controls energization of the ball ramp mechanism for controlling the magnitude of the compressive clutch engagement force applied to the friction clutch, thereby controlling the drive torque transferred from the first rotary member to the second rotary member.

According to another feature of the present invention, the control system includes an electric motor for driving the pump, vehicle sensors for detecting various operating characteristics of the motor vehicle, and an electronic control unit (ECU) for receiving input signals from the vehicle sensors and controlling energization of the electric motor. The ECU further controls actuation of a control valve associated with the hydraulic circuit for controlling the fluid pressure supplied to the actuation chambers. A pressure sensor within the hydraulic circuit provides a pressure signal to the ECU that is indicative of the fluid pressure in the actuation chambers.

The torque transfer mechanism of the present invention is adapted for use in a power transmission device for adaptively controlling the drive torque transferred between a primary driveline and a secondary driveline. According to one preferred application, the power transmission device of the present invention is a transfer case with the torque transfer mechanism arranged as a torque transfer coupling for providing on-demand torque transfer from the primary driveline to the secondary driveline. In a related application, the torque transfer mechanism is arranged as a torque bias coupling for varying the torque distribution and limiting interaxle slip between the primary and secondary driveline. According to another preferred application, the power transmission device is a drive axle assembly with the torque transfer mechanism arranged as a torque bias coupling to control speed differentiation and torque distribution across a differential unit.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, a torque transfer clutch in a transfer case, a power take-off unit or an in-line torque coupling, a torque biasing clutch associated with a differential unit in full-time transfer cases or power take-off unit or in a drive axle assembly, or any other possible torque transfer application. Thus, while the present invention is hereinafter described in association with particular power transmission devices for use in specific driveline applications, it will be understood that the arrangements shown and described are merely intended to illustrate embodiments of the present invention.

Figure 1:
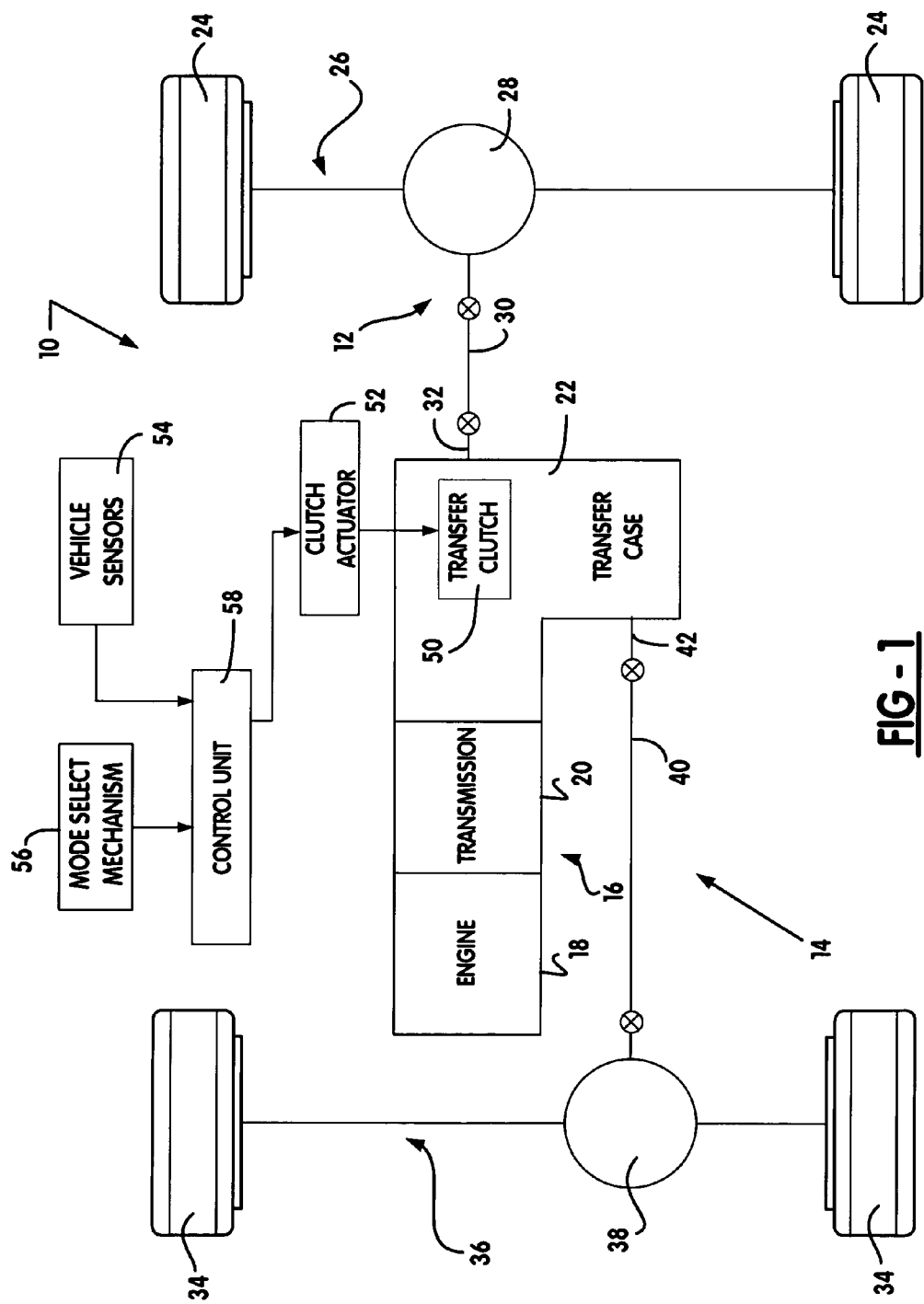
FIG. 1 illustrates the drivetrain of a four-wheel drive vehicle equipped with a power transmission device according to the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Likewise, front driveline 14 includes a pair of front wheels 34 connected at opposite ends of a front axle assembly 36 having a front differential 38 coupled to one end of a front prop shaft 40, the opposite end of which is coupled to a front output shaft 42 of transfer case 22.

With continued reference to the drawings, drivetrain 10 is shown to further include an electronically-controlled power transfer system for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing both of the part-time and on-demand four-wheel drive modes. The power transfer system further includes a power-operated clutch actuator 52 for actuating transfer clutch 50, vehicle sensors 54 for detecting certain dynamic and operational characteristics of the motor vehicle, a mode select mechanism 56 for permitting the vehicle operator to select one of the available drive modes, and an electronic control unit (ECU) 58 for controlling actuation of clutch actuator 52 in response to input signals from vehicle sensors 54 and mode selector 56.

Figure 2:
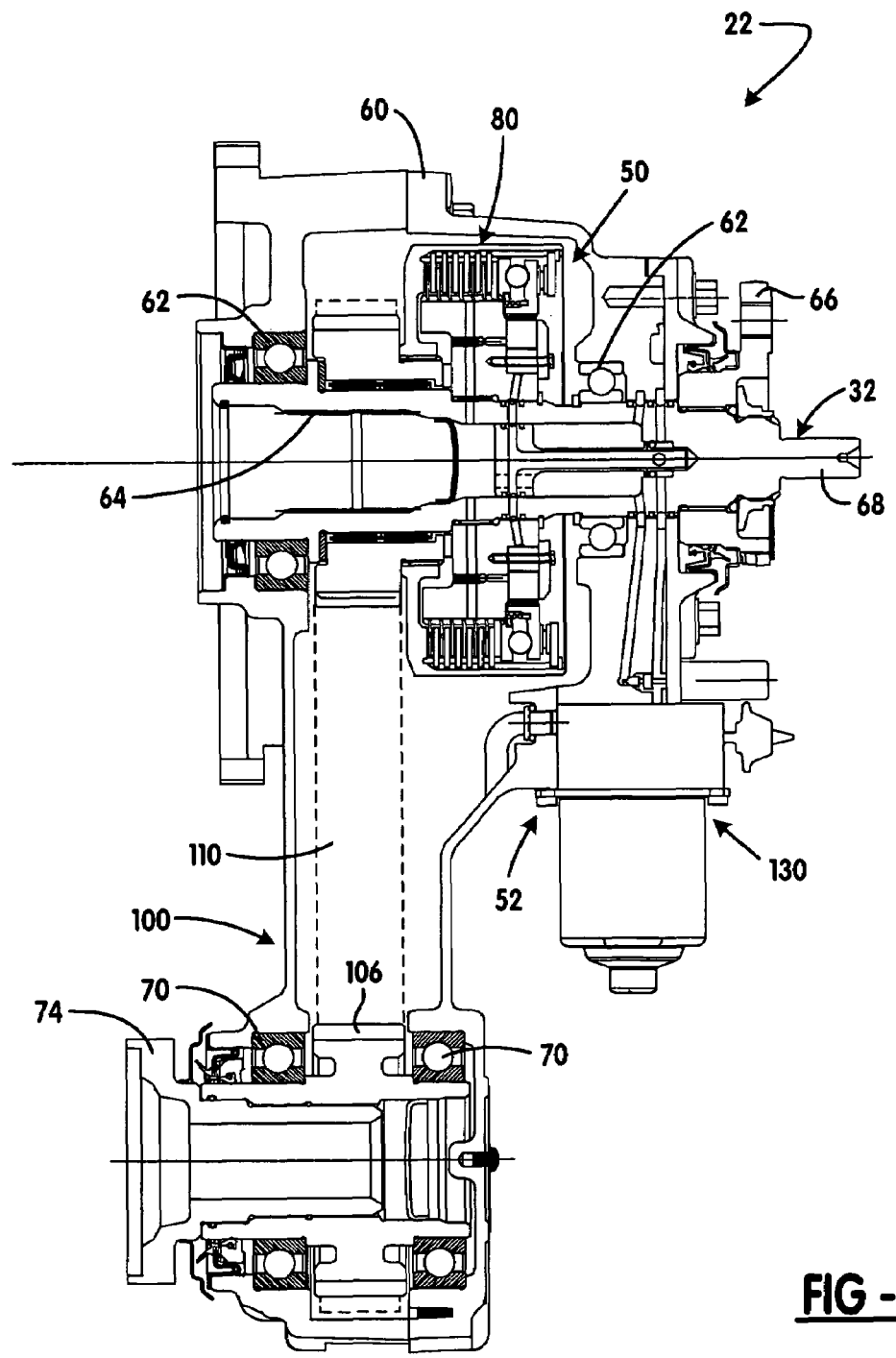
FIG. 2 is a sectional view of a transfer case associated with the drivetrain shown in FIG. 1 and which is equipped with a torque transfer mechanism according to a preferred embodiment of the present invention.

Transfer case 22 is shown in FIG. 2 to include a multi-piece housing 60 from which rear output shaft 32 is rotatably supported by a pair of laterally-spaced bearing assemblies 62. Rear output shaft 32 includes an internally-splined first end segment 64 adapted for connection to the output shaft of transmission 20 and a yoke assembly 66 secured to its second end segment 68 that is adapted for connection to rear propshaft 30. Front output shaft 42 is likewise rotatably supported from housing 60 by a pair of laterally-spaced bearing assemblies 70 and includes a yoke-type end segment 74 that is adapted for connection to front propshaft 40.

Transfer clutch 50 is a multi-plate friction clutch assembly 80 which together with power-operated clutch actuator 52 defines a torque transfer mechanism according to the preferred embodiments of the present invention. Friction clutch assembly 80 includes a hub 84 fixed via a spline connection 86 to rear output shaft 32, a drum 88, and a multi-plate clutch pack 90 that is operably disposed between hub 84 and drum 88. Clutch pack 90 includes a set of outer clutch plates 92 splined for rotation with drum 88 and which are interleaved with a set of inner clutch plates 94 splined for rotation with hub 84. As will be detailed, clutch actuator 52 is operable for generating and exerting a compressive clutch engagement force on clutch pack 90. Such engagement of clutch pack 90 causes rotary power ("drive torque") to be transferred from rear output shaft 32 to front output shaft 42 via a transfer assembly 100. Transfer assembly 100 includes a first sprocket 102 fixed via a spline connection 104 for rotation with drum 88, a second sprocket 106 fixed via a spline connection 108 for rotation with front output shaft 42, and a power chain 110 encircling sprockets 102 and 106. First sprocket 102 is shown fixed to an end plate segment 112 of drum 88 and is rotatably supported on rear output shaft 32 via a suitable bearing assembly 114. A thrust bearing 116 is shown disposed between first sprocket 102 and hub 84.

As will be detailed, clutch actuator 52 is operable for controlling axial movement of a pressure plate 120 and thus, the magnitude of the clutch engagement force applied to clutch pack 90. In particular, pressure plate 120 is splined for rotation with hub 84 and is axially moveable thereon relative to clutch pack 90 between a first or "released" position and a second or "locked" position. With pressure plate 120 in its released or released position, a minimum clutch engagement force is exerted on clutch pack 90 such that virtually no drive torque is transferred from rear output shaft 32 through clutch assembly 80 and transfer assembly 100 to front output shaft 42, thereby establishing the two-wheel drive mode. In contrast, movement of pressure plate 120 to its locked position causes a maximum clutch engagement force to be applied to clutch pack 90 such that front output shaft 42 is, in effect, coupled for common rotation with rear output shaft 32, thereby establishing the part-time four-wheel drive mode. Accordingly, controlling the position of pressure plate 120 between its released and locked positions permits adaptive regulation of the amount of drive torque transferred from rear output shaft 32 to front output shaft 42, thereby establishing the on-demand four-wheel drive mode.

To provide means for moving pressure plate 120 between its released and locked positions, clutch actuator 52 generally includes a fluid pump 122, a rotary operator 124 and a ball ramp unit 126. An electric motor 128 is provided to drive pump 122 and together they define an electrohydraulic power unit 130 that is secured to housing 60. Rotary actuator 124 is shown to include a first or "reaction" ring 132 that is concentrically aligned with a second or "actuation" ring 134. The rings are retained on a tubular sleeve segment 136 of clutch hub 84 via a retainer ring 140. As seen, retainer ring 140 is secured by fasteners, such as bolts 142, to hub 84. Bolts 142 also pass through mounting bores 144 in reaction ring 132 such that reaction ring 132 is fixed to hub 84 for common rotation with rear output shaft 32.

Figure 4:
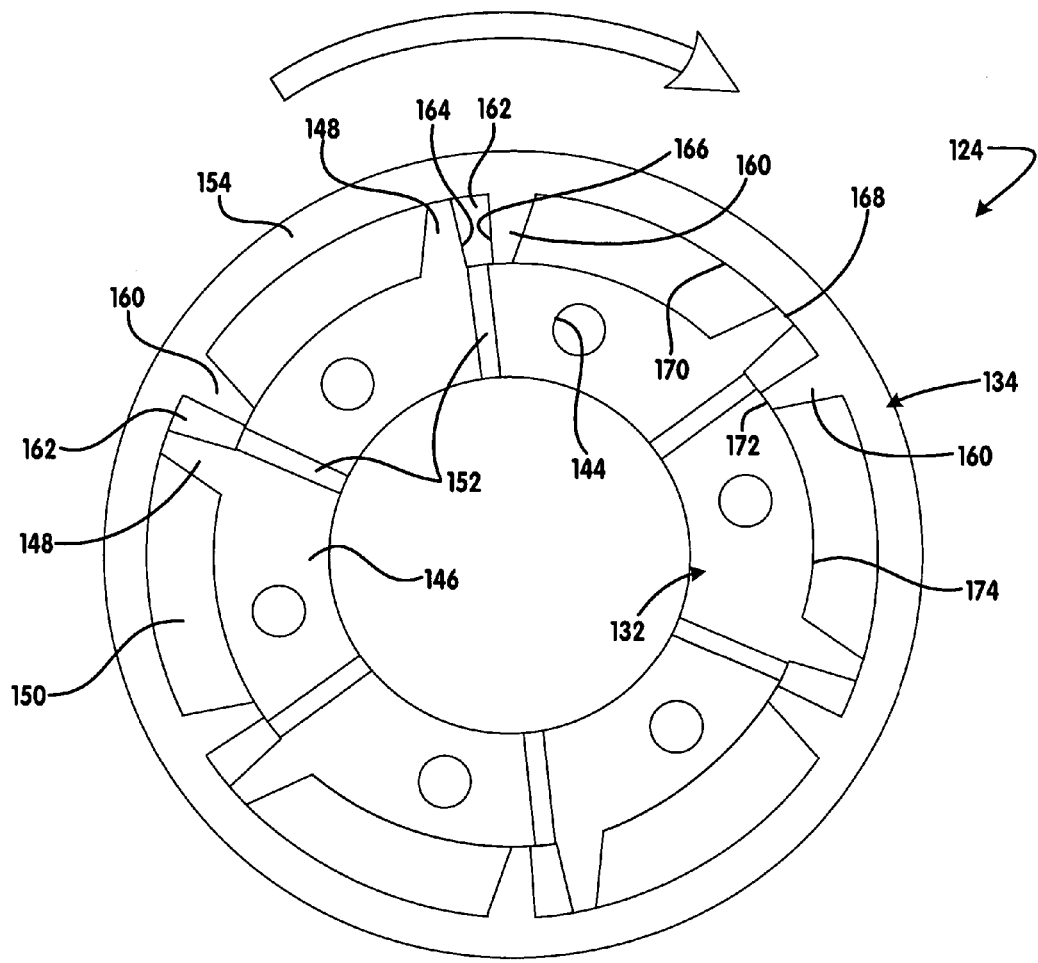
FIG. 4 is a partial sectional view of a rotary operator mechanism associated with the torque transfer mechanism of the present invention.

As best seen from FIG. 4, reaction ring 132 includes a cylindrical body segment 146 and a plurality of radially outwardly projecting lugs 148. Lugs 148 define a complementary number of longitudinally extending channels 150 therebetween with a like number of radial inlet ports 152 extending through body segment 146 and communicating with channels 150. Actuator ring 134 also has a cylindrical body segment 154 that is fixed via a spline connection 156 to a first cam member 158 of ball ramp unit 126. In addition, a plurality of radially projecting lugs 160 extend inwardly from body segment 154. Each lug 160 extends into a corresponding one of channels 150 so as to define a series of actuation chambers 162 delimited by a face surface 164 of lugs 148 and a face surface 166 of lugs 160. Likewise, a distal end surface 168 on each lug 148 is in sliding engagement with an inner wall surface 170 of body segment 154 while a distal end surface 172 on each lug 160 is in sliding engagement with outer wall surface 174 of body segment 146 so as to further delimit each actuation chamber 162.

Reaction ring 132 further includes a series of inlet ports 152 in communication with actuation chambers 162. As will be described, increasing the fluid pressure delivered through inlet ports 152 to actuation chambers 162 causes actuator ring 134 to move (i.e., index) in a first rotary direction (i.e., clockwise) relative to reaction ring 132 for energizing ball ramp unit 126 which, in turn, causes corresponding movement of pressure plate 120 toward its locked position, In contrast, decreasing the fluid pressure in actuation chambers 162 causes actuator ring 134 to move in a second rotary direction (i.e., counterclockwise) relative to reaction ring 132 for de-energizing ball ramp unit 126 which, in turn, causes corresponding movement of pressure plate 120 toward its released position.

Ball ramp unit 126 includes first cam member 158, a second cam member 180 and rollers 182. As noted, first cam member 158 is splined for common rotary movement with actuator ring 134 of rotary operator 124. In contrast, second cam member 158 is splined for rotation with hub 84 so as to be rotatively driven by rear output shaft 32. In addition, second cam member 180 is arranged to engage pressure plate 120. Balls 182 are disposed in a cam channel defined between cam tracks 186 formed in first cam member 158 and cam tracks 188 formed in second cam member 180. Preferably, a plurality of cam channels are provided between cam members 158 and 180 which are each configured as an oblique section of a helical torus. Balls 182 and cam tracks 186, 188 may be replaced with alternative components and/or tapered ramp profiles that functions to cause axial movement of second cam member 180 in response to relative angular movement between the cam members. In any arrangement, the load transferring components can not be self-locking or self-engaging so as to permit fine control over the translational movement of pressure plate 120 for providing precise control of the clutch engagement force applied to clutch pack 90. A thrust bearing assembly 190 is disposed between first cam member 158 and a retainer plate 192 that is splined to drum 88. A lock ring 194 axially locates retainer plate 192 for preventing axial movement of first cam 158.

Ball ramp unit 126 further includes a torsional return spring 196 that is operably connected between first cam member 158 and second cam member 180. Return spring 196 functions to angularly bias the cam members to return to a retracted position for de-energizing ball ramp unit 126. Angular movement of the cam members to the retracted position due to the biasing of return spring 196 results in rearward translation of second cam member 180 and angular movement of actuator ring 134 in the second direction relative to reaction ring 132 toward a first or "low pressure" position, as is shown in FIG. 4. As such, pressure plate 120 is permitted to move to its released position for exerting the minimum clutch engagement force on clutch pack 90. Rotary operator 124 is designed to provide internal fluid leakage paths which permit fluid in actuation chambers 162 to leak out at a predetermined rate so as to permit the biasing force of return spring 196 to angularly move actuator ring 134 toward its low pressure position.

In operation, the delivery of fluid to actuation chambers 162 causes actuator ring 134 to rotate relative to reaction ring 132 in the first direction from its low pressure position toward a second or "high pressure" position which, in turn, results in corresponding relative rotation between cam members 158 and 180 from the retracted position toward a second or "extended" position. In essence, such angular movement of actuator ring 134 acts to initiate energization of ball ramp unit 126. Accordingly, the profile of cam tracks 186 and 188 establishes the resultant amount of forward axial movement of second cam member 180 required to cause corresponding axial movement of pressure plate 120 from its released position toward its locked position. A maximum clutch engagement force is exerted on clutch pack 90 for fully engaging transfer clutch 50 when pressure plate 120 is located in its locked position.

With pressure plate 120 in its released position, virtually no drive torque is transferred from rear output shaft 32 to front output shaft 42 through transfer clutch 50 so as to effectively establish the two-wheel drive mode. In contrast, location of pressure plate 120 in its locked position results in a maximum amount of drive torque being transferred to front output shaft 42 for, in effect, coupling front output shaft 42 for common rotation with rear output shaft 32, thereby establishing the part-time four-wheel drive mode. Accordingly, controlling the position of pressure plate 120 between its released and locked positions permits variable control of the amount of drive torque transferred from rear output shaft 32 to front output shaft 42, thereby establishing the on-demand four-wheel drive mode. Thus, the magnitude of the fluid pressure supplied to actuation chambers 162 controls the angular position of actuator ring 134 relative to reaction ring 132 for controlling actuation of ball ramp unit 126 and, in turn, axial movement of pressure plate 120 between its released and locked positions.

Figure 5:
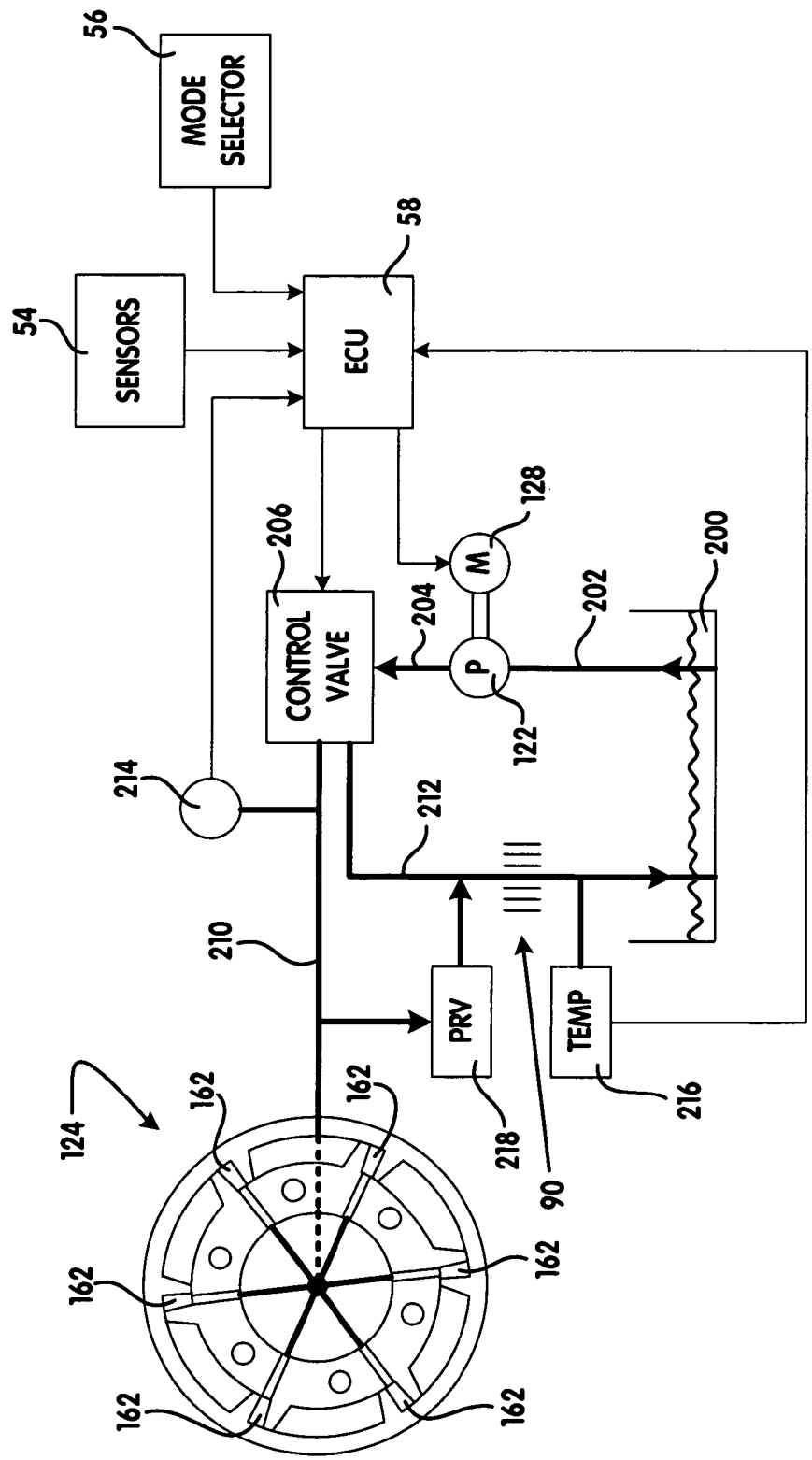
FIG. 5 is a schematic diagram of a hydraulic control circuit associated with the torque transfer mechanism of the present invention.

A hydraulic flow circuit is provided within transfer case 22 for supplying fluid from pump 122 to actuation chambers 162. Referring initially to FIG. 5, a schematic of the hydraulic flow circuit will be described. Specifically, hydraulic fluid from a source of fluid or sump 200 maintained with transfer case housing 60 is drawn through a first flow path 202 to an inlet of pump 122. Actuation of motor 128 controls the magnitude of the line pressure delivered through a second flow path 204 from an outlet of pump 122 to an inlet of an electrically-actuated control valve 206. Control valve 206 includes a moveable valve element 208 (see FIG. 3B) that regulates the delivery of fluid from its inlet to at least one of a pair of outlets. Preferably, control valve 206 is an electromagnetic flow control valve. However, it will be understood that any type of electrically-actuated control valve that is capable of regulating fluid pressure can be used. The first outlet supplies fluid to actuation chambers 162 of rotary operator 124 through a third flow path 210 while the second outlet supplies fluid to cool and lubricate clutch pack 90 through a fourth flow path 212. ECU 58 sends electrical control signals to both electric motor 128 and control valve 206 for accurately controlling the fluid pressure supplied through third flow path 210 to actuation chambers 162 by utilizing a predefined control strategy that is based on the mode signal from mode selector 56 and the sensor input signals from vehicle sensors 54. A pressure sensor 214 sends a signal to ECU 58 that is indicative of the fluid pressure in actuation chambers 162. In addition, a temperature sensor 216 sends a signal to ECU 58 that is indicative of the fluid temperature in fourth flow path 214 for permitting improved control over the cooling of clutch pack 90. Finally, a pressure relief valve 218 is provided for selectively venting fluid from actuation chambers 162 into fourth flow path 214 so as to limit the fluid pressure within actuation chambers 162 to a predetermined maximum pressure value.

Figure 3A:
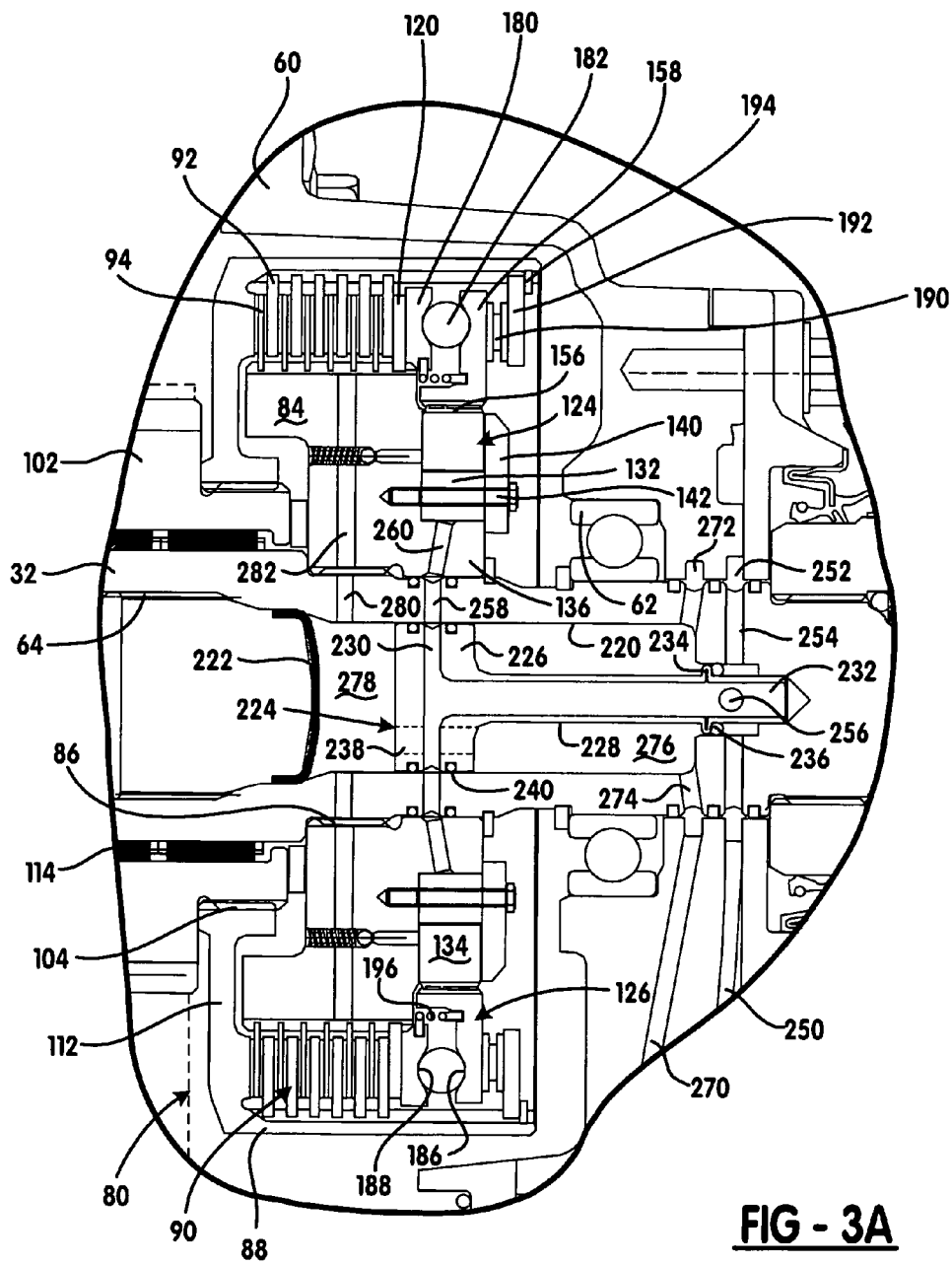
FIGS. 3A and 3B are enlarged partial views taken from FIG. 2 showing components of the torque transfer mechanism is greater detail.
Figure 3B:
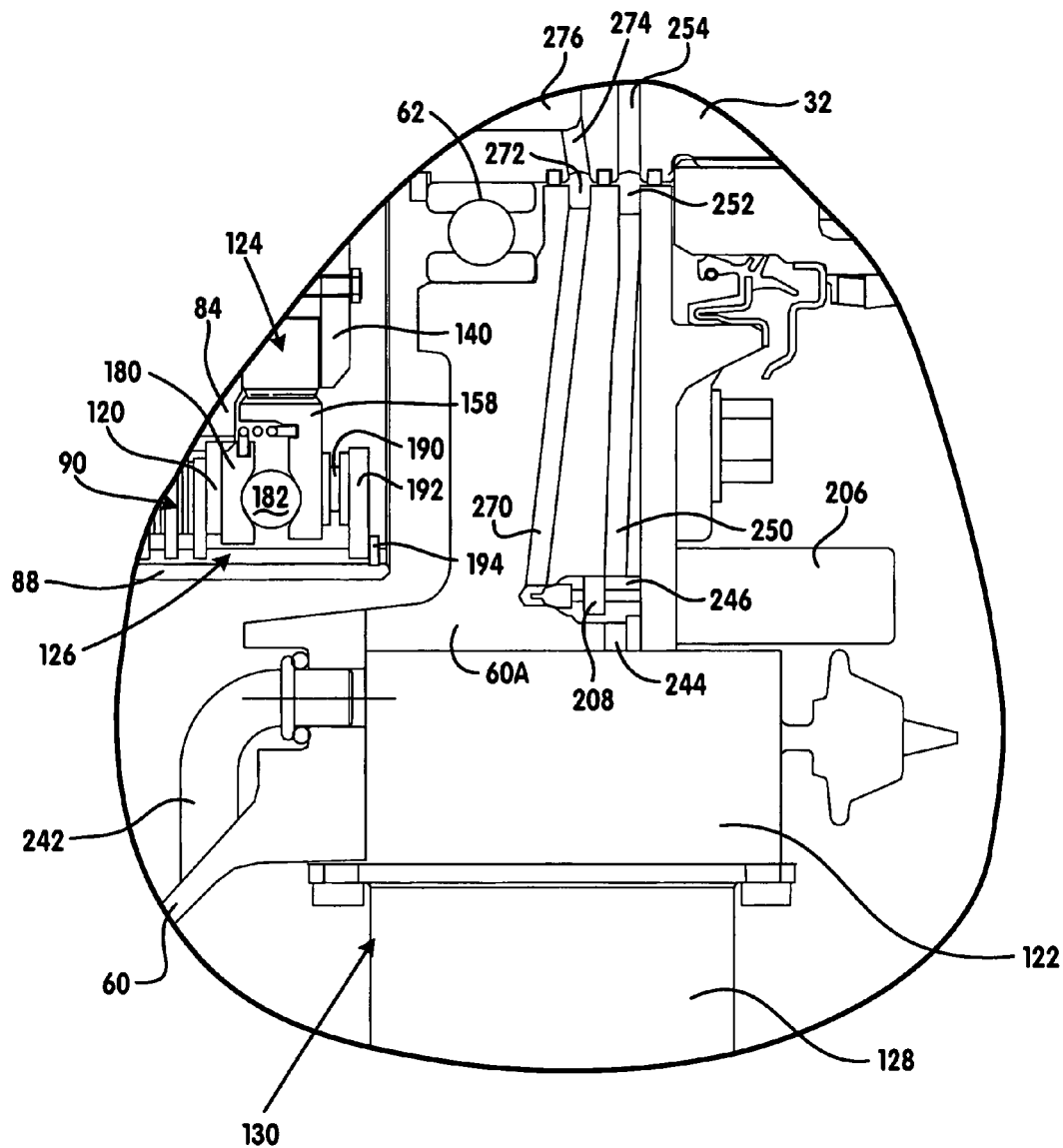

Referring primarily now to FIGS. 3A and 3B, the structure associated with transfer case 22 for providing the flow paths schematically shown in FIG. 5 will now be described in greater detail. As seen, a central chamber 220 is formed in rear output shaft 32 and is sealed via a seal cup 222. A separator 224 is retained within chamber 220 and includes a cylindrical hub segment 226 and an elongated tube segment 228. Hub segment 226 has a series of radial flow ports 230 which communicate with a large diameter longitudinal flow port 232 formed in tube segment 228. As seen, an end portion of tube segment 228 is retained in a small diameter portion of central chamber 220 and has a flange 234 delimiting an intermediate diameter portion of central chamber from its large diameter portion. A ring seal 236 provides a fluid-tight interface between the intermediate and large diameter portions of central chamber 220. In addition, one or more by-pass ports 238 extend through hub segment 226 of separator 224. Suitable seal rings 240 provide a fluid-tight seal between radial flow ports 230 and large diameter portion of chamber 220.

First flow path 202 includes an inlet hose 242 which provides fluid communication between the internal fluid sump 200 provided within housing 60 and the inlet to pump 122. Second flow path 204 includes a flow port 244 which delivers fluid at line pressure to a valve chamber 246 within which valve element 208 is retained for reciprocal movement. Flow port 244 and valve chamber 246 are formed in a valvebody segment 60A of housing. Third flow path 210 includes a flow passage 250 formed in valvebody housing segment 60A which communicates with the first outlet of valve chamber 246, an annular chamber 252 which communicates with passage 250, and a series of radial passages 254 formed in rear output shaft 32 which provide fluid communication between chamber 252 and intermediate diameter portion of central chamber 220. Radial ports 230 and longitudinal port 232 in separator 224 are also part of third flow path 210 and are in fluid communication with intermediate diameter portion of central chamber 220 via one or more throughbores 256 in tube segment 228. Third flow path 210 also includes a plurality of radial flow passages 258 formed through rear output shaft 32 which connect radial ports 230 in separator 224 with flow passages 260 formed through hub segment 136 of clutch hub 84. Finally, flow passages 260 in hub 84 are in fluid communication with radial inlet ports 152 formed through body segment 146 of reaction ring 132. As such, the fluid supplied from valve chamber 246 to the inlet of flow passage 250 will flow through third flow path 210 into actuation chambers 162.

Fourth flow path 212 includes a flow passage 270 in valvebody housing segment 60A which communicates with the second outlet of valve chamber 246, an annular chamber 272 which communicates with passage 270, and a series of radial passages 274 formed in rear output shaft 32 which interconnect chamber 272 to a first chamber 276 formed in large diameter portion of central chamber 220. First chamber 276 surrounds tube segment 288 of separator 224 and is in fluid communication with a second chamber 278 via by-pass ports 238. Fourth flow path 212 further includes a series of radial passages 280 formed through rear shaft 32 which communicate with throughbores 282 formed in clutch hub 84. As such, low pressure fluid supplied from valve chamber 246 to the inlet of flow passage 270 will flow through this flow path and through the interleaved clutch plates of clutch pack 90 before returning to sump 200. In this manner, the heat generated within clutch pack 90 can be transferred to the fluid prior to its return to sump 200.

In operation, if the two-wheel drive mode is selected, control valve 206 is de-actuated such that valve element 208 moves to a position where fluid flow from flow port 244 to flow passage 250 is blocked. As such, the biasing of return spring 196 and the leakage paths within rotary operator 124 cause actuator ring 134 to index relative to reaction ring 132 in the second direction toward its low pressure position, whereby ball ramp unit 126 is de-energized and pressure plate 120 is permitted to return to its released position for releasing transfer clutch 50. In contrast, upon selection of the part-time four-wheel drive mode, control valve 206 is fully activated to move valve element 208 to a position where flow passage 250 receives the full line pressure from pump 122 through port 244. This high pressure fluid is delivered through third flow path 210 to actuation chambers 162 for causing actuator ring 134 to index relative to reaction ring 132 in the first direction until located in its high pressure position, whereby ball ramp unit 126 is fully energized and pressure plate 120 is moved to its locked position for fully engaging transfer clutch 50. As stated, the pressure signal sent from pressure sensor 214 to ECU 58 and use of pressure relief valve 218 function to limit the maximum fluid pressure that can be delivered to actuation chambers 162, thereby preventing damage to clutch pack 90.

When mode selector 52 indicates selection of the on-demand four-wheel drive mode, ECU 58 energizes motor 128 for initiating a fluid pumping action in pump 122 and also controls energization of control valve 206 for supplying a predetermined initial fluid pressure to actuation chambers 162 that results in a slight indexing of actuator ring 134 relative to reaction ring 132 in the first direction. This angular movement causes actuator ring 134 to move from its low pressure position to an intermediate or "ready" position which, in turn, results in ball ramp unit 126 moving pressure plate 120 from its released position to a "stand-by" position. Accordingly, a predetermined minimum amount of drive torque is delivered to front output shaft 42 through transfer clutch 50 in this adapt-ready condition. Thereafter, ECU 58 determines when and how much drive torque needs to be transferred to front output shaft 42 based on the current tractive conditions and/or operating characteristics of the motor vehicle, as detected by sensors 54. Sensors 54 detect such parameters as, for example, the rotary speed of the output shafts (via speed sensors), the vehicle acceleration (via a throttle sensor), the transmission gear, the on/off status of the brakes, the steering angle, the vehicle speed, the road conditions, etc. Such sensor signals are used by ECU 58 to determine a desired output torque value utilizing a control scheme that is incorporated into ECU 58. This desired torque value is used to actively control actuation of electric motor 128 and control valve 206 to generate a corresponding pressure level in actuation chamber 162. One non-limiting example of a clutch control scheme and the various sensors used therewith is disclosed in commonly-owned U.S. Pat. No. 5,323,871 which is incorporated by reference herein.

In addition, the present invention permits automatic release of transfer clutch 50 in the event of an ABS braking condition or during the occurrence of an over-temperature condition. Furthermore, while the control scheme was described based on an on-demand strategy, it is contemplated that a differential "mimic" control strategy could likewise be used. Specifically, the torque distribution between rear output shaft 32 and front output shaft 42 can be controlled to maintain a predetermined rear/front ratio (i.e., 70:30, 50:50, etc.) so as to simulate the inter-axle torque splitting feature typically provided by a mechanical differential unit. In either case, accurate control of the fluid pressure delivered from pump 122 to actuation chambers 162 of rotary operator 124 will result in the desired torque transfer characteristics across transfer clutch 50.

Figure 6:
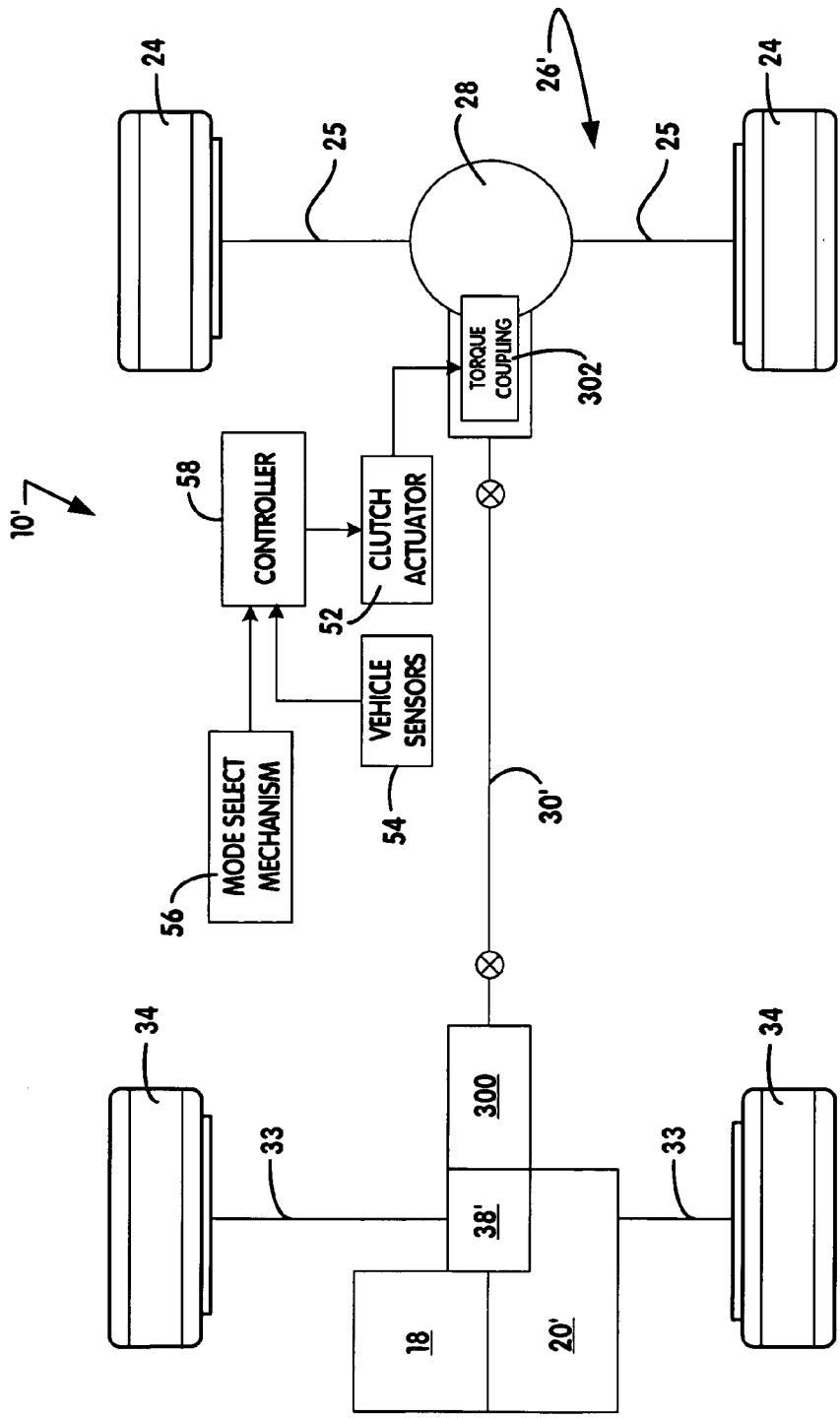
FIG. 6 is a schematic illustration of an alternative driveline for a four-wheel drive motor vehicle equipped with a power transmission device of the present invention.

To illustrate an alternative power transmission device to which the present invention is applicable, FIG. 6 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer or power take-off unit (PTU) 300 is also driven by transmission 20' for delivering drive torque to the input member of a torque transfer mechanism, such as an in-line torque transfer coupling 302, via a drive shaft 30'. Torque transfer coupling 302 is preferably integrated with the components of axle assembly 26 to define a drive axle assembly 26'. In particular, the input member of torque coupling 302 is coupled to drive shaft 30' while its output member is coupled to a drive component of rear differential 28 which, in turn, drives rear wheels 24 via axleshafts 25. Accordingly, when sensors 54 indicate the occurrence of a front wheel slip condition, ECU 58 adaptively controls actuation of torque coupling 302 such that drive torque is delivered "on-demand" to rear wheels 24. It is contemplated that torque transfer coupling 302 includes a multi-plate clutch assembly and an electrohydraulic clutch actuator that are similar in both structure and function to the torque transfer mechanism previously described herein. Accordingly, common reference numerals are used to identify components previously described.

Figure 7:
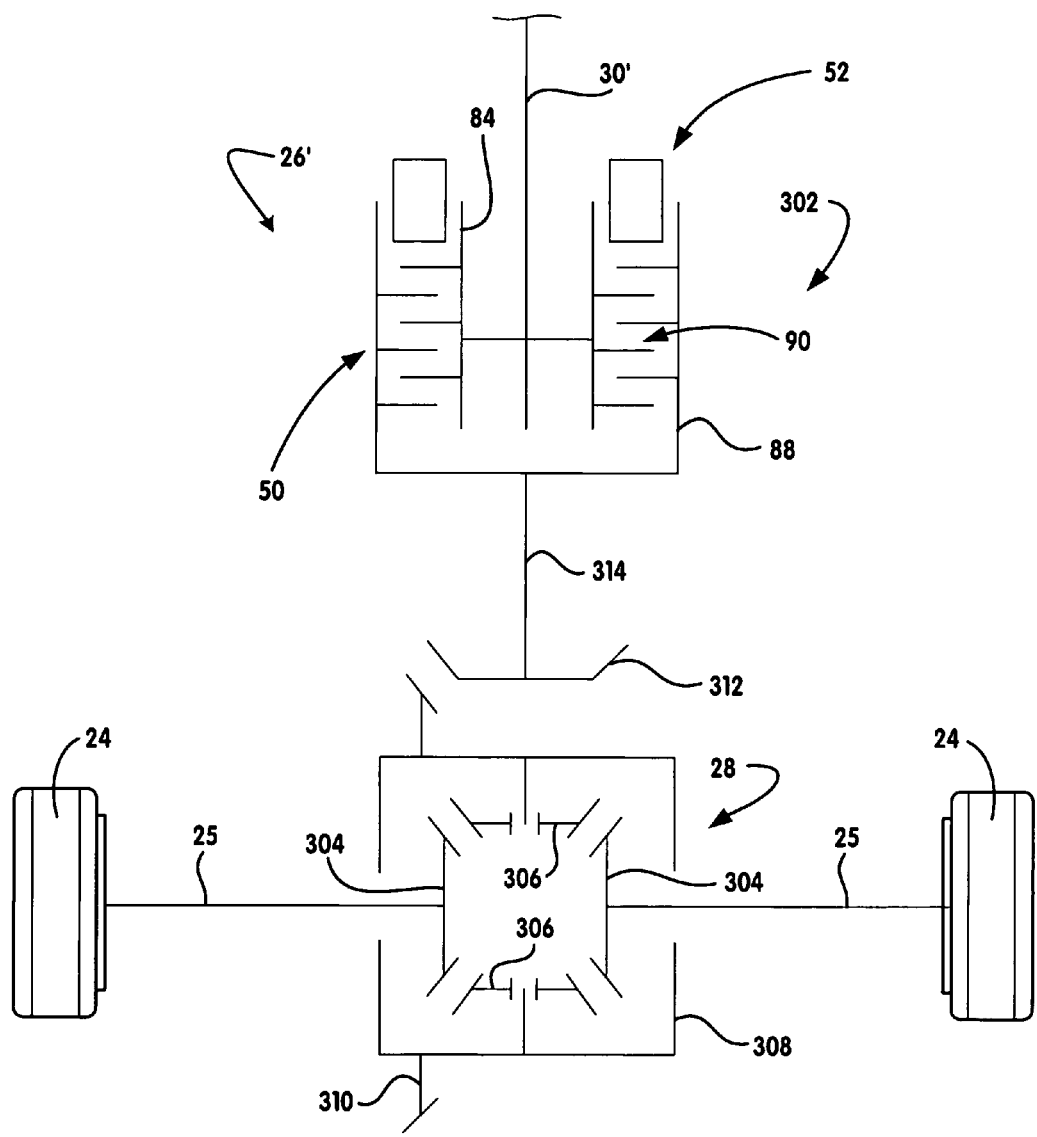
FIG. 7 is a schematic illustration of a drive axle assembly associated with the drivetrain shown in FIG. 6 and equipped with a torque transfer mechanism according to the present invention.

Referring to FIG. 7, torque coupling 302 is schematically illustrated to be operably disposed between drive shaft 30' and rear differential 28. Rear differential 28 includes a pair of side gears 304 that are connected to rear wheels 24 via rear axle shafts 25. Differential 28 also includes pinions 306 that are rotatably supported on pinion shafts fixed to a carrier 308 and which mesh with side gears 304. A right-angled drive mechanism is associated with differential 28 and includes a ring gear 310 that is fixed for rotation with carrier 308 and meshed with a pinion gear 312 that is fixed for rotation with a pinion shaft 314. Torque coupling 302 is schematically shown to include a mutli-plate clutch assembly 80 operably disposed between driveshaft 30' and pinion shaft 314 and which includes a hub 84 fixed for rotation with driveshaft 30', a drum 88 fixed for rotation with pinion shaft 304, and a clutch pack 90. Torque coupling 302 also includes an electrohydraulic clutch actuator 52 for controlling the magnitude of the clutch engagement force applied to clutch assembly 80 and thus the amount of drive torque transferred from drive shaft 30' to rear differential 28.

Torque coupling 302 permits operation in any of the drive modes previously disclosed. For example, if the on-demand 4WD mode is selected, ECU 58 regulates activation of clutch actuator 52 in response to the operating conditions detected by sensors 54 by controllably varying the electric control signal sent to motor 128 and control valve 206. Selection of the part-time 4WD mode results in complete engagement of clutch pack 90 such that pinion shaft 314 is, in effect, rigidly coupled to driveshaft 30'. Finally, in the two-wheel drive mode, clutch pack 90 is released such that pinion shaft 312 is free to rotate relative to driveshaft 30'. Alternatively, elimination of mode select mechanism 56 would provide automatic on-demand operation of torque coupling 302 in a manner completely transparent to the vehicle operator.

Figure 8:
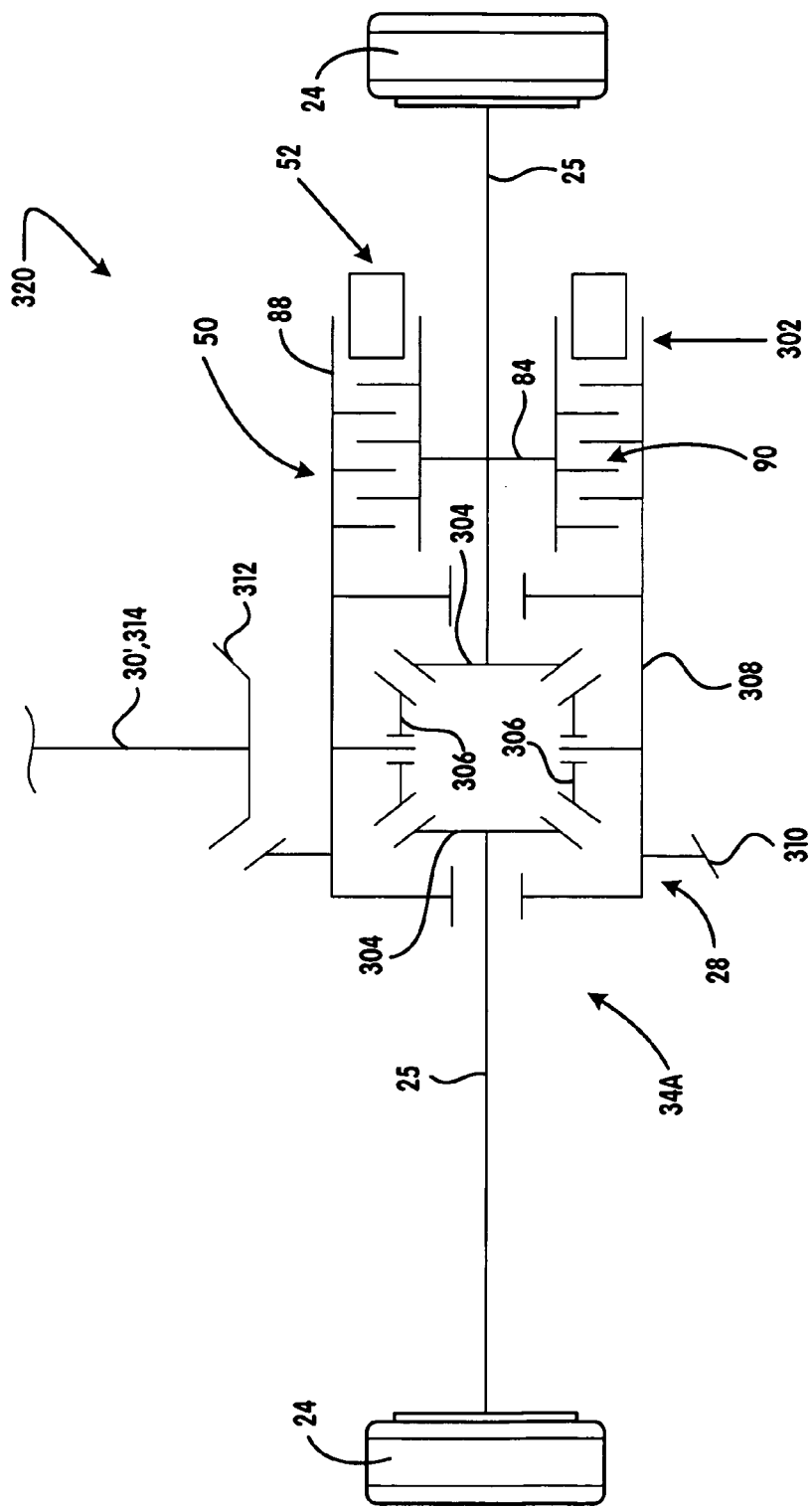
FIG. 8 is a schematic illustration of an alternative drive axle assembly operable for use with either of the drivetrain shown in FIGS. 1 and 6.

The arrangement shown for drive axle assembly 26' of FIG. 7 is operable to provide on-demand four-wheel drive by adaptively transferring drive torque from the primary driveline to the secondary driveline. In contrast, a drive axle assembly 320 is shown in FIG. 8 wherein a torque bias coupling 302 is operably installed between differential case 308 and one of axleshafts 25 to provide an adaptive side-to-side torque biasing and slip limiting feature. As before, torque bias coupling 302 is schematically shown to again include a transfer clutch 50 and an electrohydraulic clutch actuator 52, the construction and function of which are understood to be similar to the detailed description previously provided herein for each sub-assembly.

Figure 9:
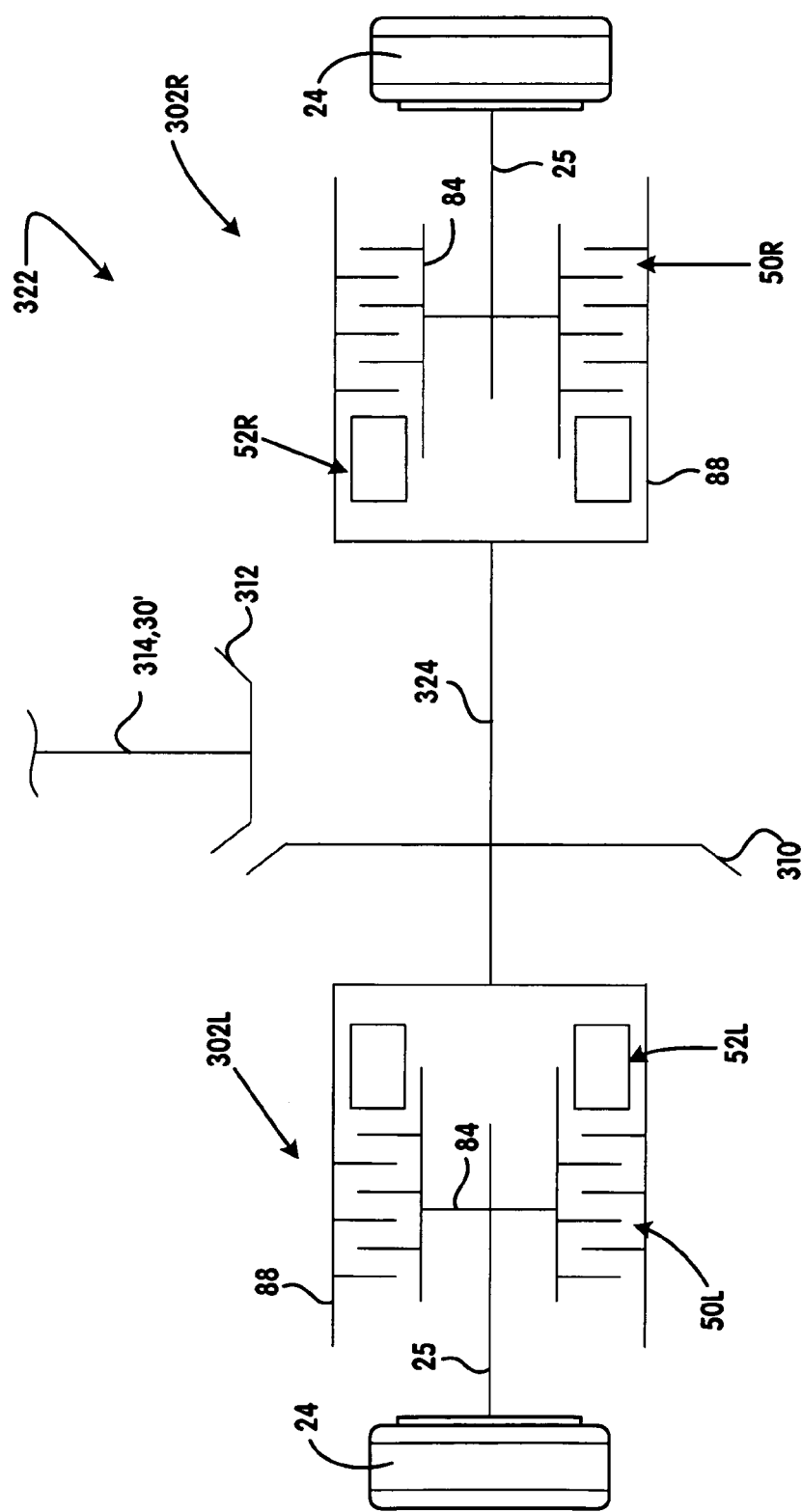
FIG. 9 is a schematic illustration of another alternative embodiment of a power transmission device according to the present invention.

Referring now to FIG. 9, a drive axle assembly 322 is schematically shown to include a pair of torque couplings 302L and 302R that are operably installed between a driven pinion shaft 314 or 30' and axleshafts 25. The driven pinion shaft drives a right-angled gearset including pinion 312 and ring gear 310 which, in turn, drives a transfer shaft 324. First torque coupling 302L is shown disposed between transfer shaft 324 and the left one of axleshafts 25 while second torque coupling 302R is disposed between transfer shaft 324 and the right axle shaft 25. Each torque coupling includes a corresponding transfer clutch 50L, 50R and electrohydraulic clutch actuator 52L, 52R. Accordingly, independent torque transfer and slip control between the driven pinion shaft and each rear wheel 24 is provided by this arrangement.

Figure 10:
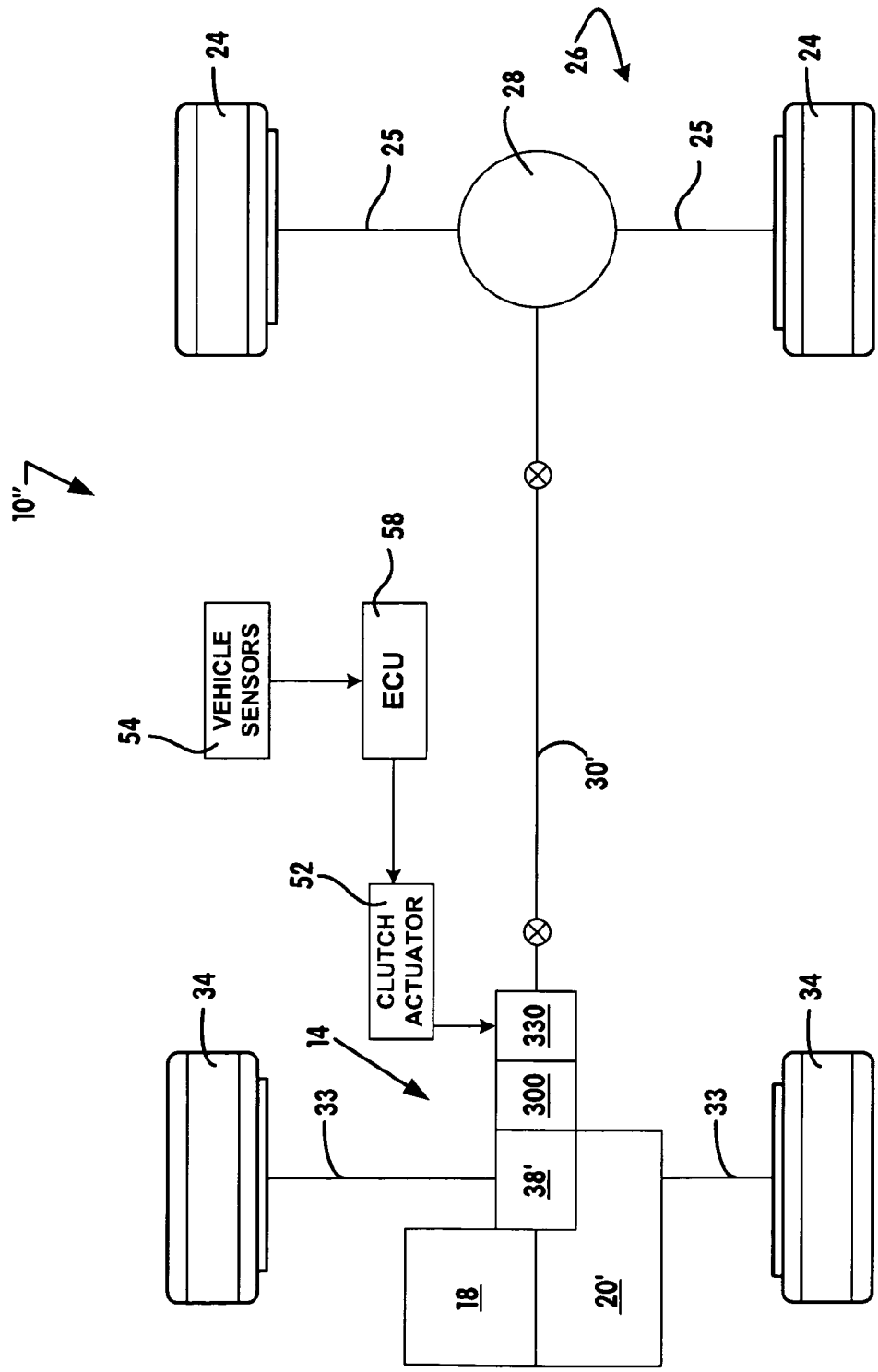
FIG. 10 illustrates another alternative drivetrain arrangement for a four-wheel drive motor vehicle equipped with another power transmission device embodying the present invention.

To illustrate additional alternative power transmission devices to which the present invention is applicable, FIG. 10 schematically depicts a front-wheel based four-wheel drive drivetrain layout 10" for a motor vehicle. In particular, engine 18 drives multi-speed transaxle 20' which has an integrated front differential unit 38' for driving front wheels 34 via axle shafts 33. As before, PTU 300 is also driven by transaxle 20' for delivering drive torque to the input member of a torque transfer coupling 330. The output member of torque transfer coupling 330 is coupled to propshaft 30' which, in turn, drives rear wheels 24 via axleshafts 25. Rear axle assembly 26 can be a traditional driven axle with a differential or, in the alternative, be similar to the drive axle arrangements described with reference to FIG. 8 or 9. Accordingly, in response to the occurrence of a front wheel slip condition, torque coupling 330 delivers drive torque "on-demand" to rear wheels 24. It is contemplated that torque coupling 330 would be generally similar in structure and function to that of torque transfer coupling 302 previously described herein. As such, its primary components of a transfer clutch 50 and an electrohydraulic clutch actuator 52 are schematically shown.

Figure 11:
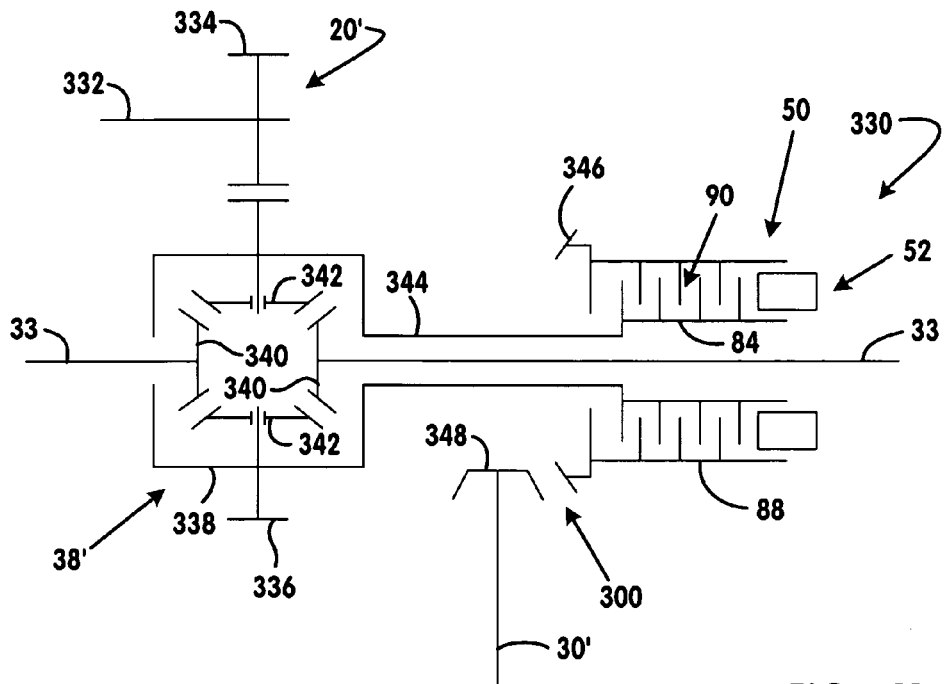
FIG. 11 through 14 schematically illustrate different embodiments of the power transmission device shown in FIG. 10.

Referring now to FIG. 11, torque coupling 330 is schematically illustrated in association with an on-demand four-wheel drive system based on a front-wheel drive vehicle similar to that shown in FIG. 10. In particular, an output shaft 332 of transaxle 20' is shown to drive an output gear 334 which, in turn, drives an input gear 336 that is fixed to a carrier 338 associated with front differential unit 38'. To provide drive torque to front wheels 34, front differential unit 38' includes a pair of side gears 340 that are connected to front wheels 34 via axleshafts 33. Differential unit 38' also includes pinions 342 that are rotatably supported on pinion shafts fixed to carrier 338 and which are meshed with side gears 340. A transfer shaft 344 is provided for transferring drive torque from carrier 338 to a clutch hub 84 associated with transfer clutch 50. PTU 300 is a right-angled drive mechanism including a ring gear 346 fixed for rotation with drum 88 of transfer clutch 50 and which is meshed with a pinion gear 348 fixed for rotation with propshaft 30'. According to the present invention, the components schematically shown for torque transfer coupling 330 are understood to be similar to those previously described. In operation, drive torque is transferred on-demand from the primary (i.e., front) driveline to the secondary (i.e., rear) driveline based on the adaptive control scheme associated with ECU 58.

Figure 12:
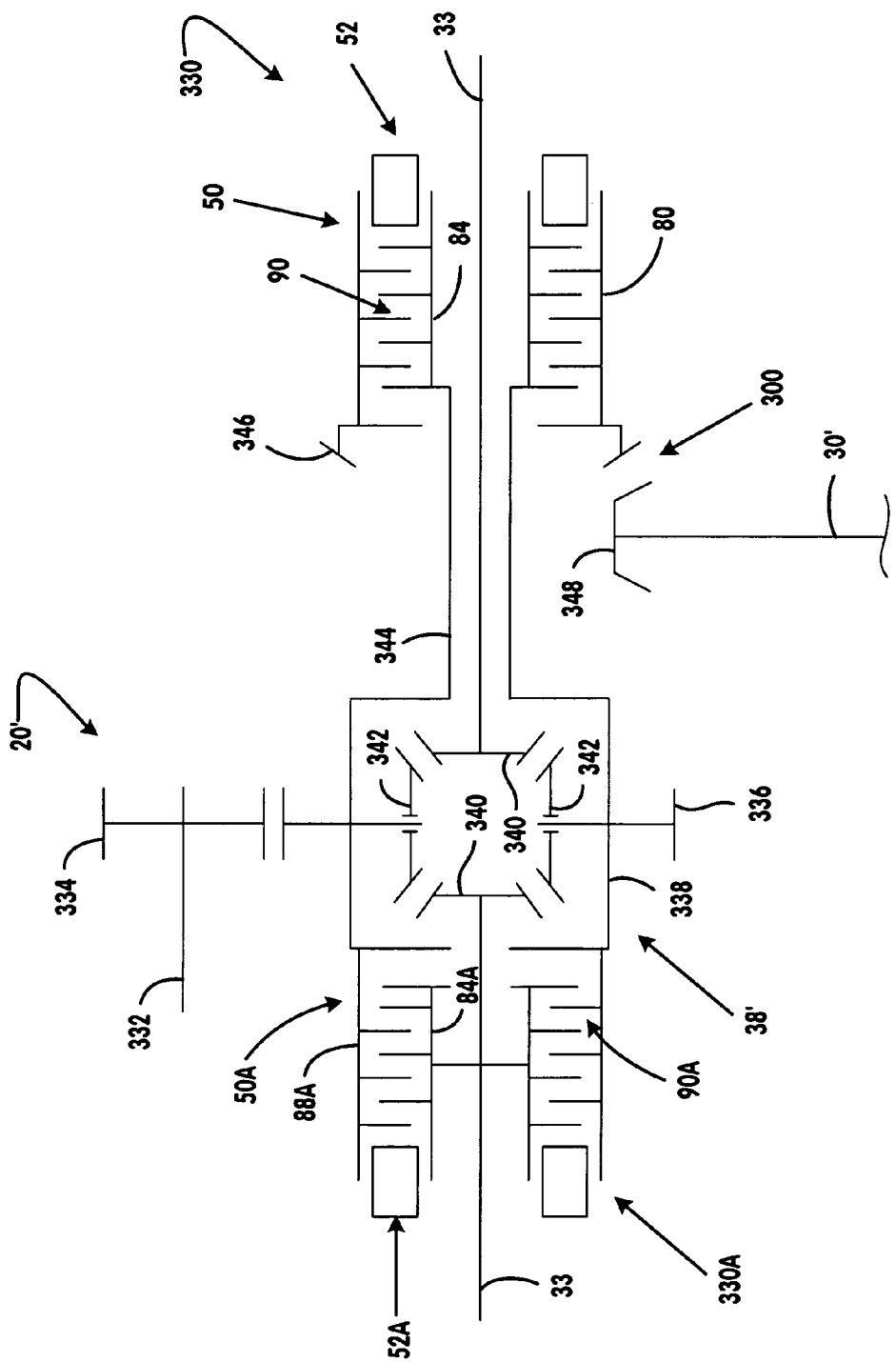

Referring to FIG. 12, a modified version of the power transmission device shown in FIG. 11 is now shown to include a second torque coupling 330A that is arranged to provide a limited slip feature in association with primary differential 38'. As before, adaptive control of torque coupling 330 provides on-demand transfer of drive torque from the primary driveline to the secondary driveline. In addition, adaptive control of second torque coupling 330A provides on-demand torque biasing (side-to-side) between axleshafts 33 of primary driveline 14.

Figure 13:
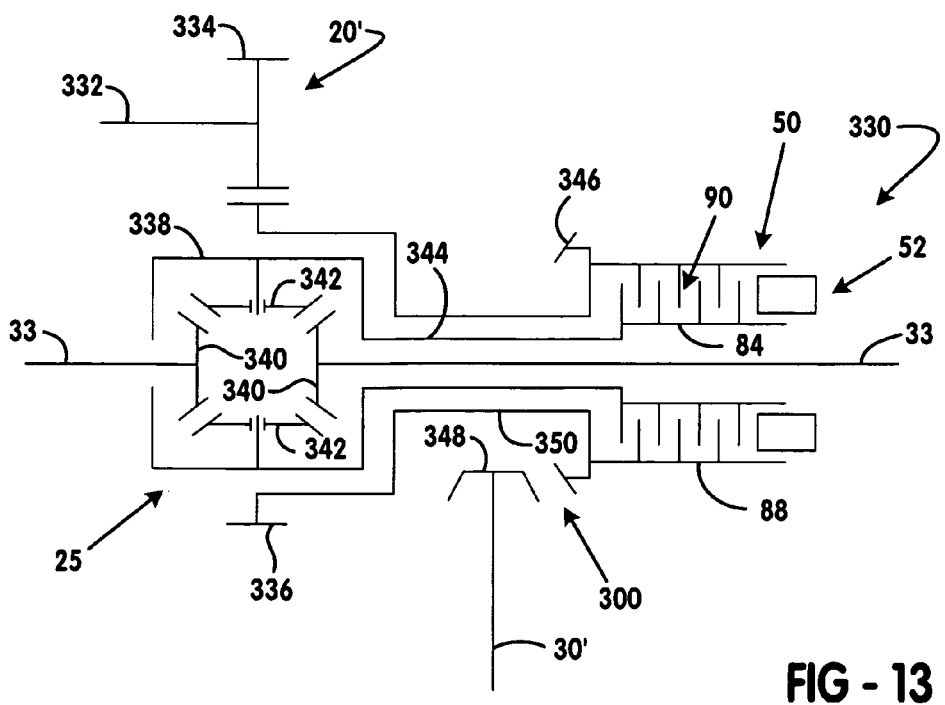

FIG. 13 illustrates another modified version of FIG. 9 wherein an on-demand four-wheel drive system is shown based on a rear-wheel drive motor vehicle that is arranged to normally deliver drive torque to rear wheels 24 while selectively transmitting drive torque to front wheels 34 through torque coupling 330. In this arrangement, drive torque is transmitted directly from transmission output shaft 332 to power transfer unit 300 via a drive shaft 350 which interconnects input gear 336 to ring gear 346. To provide drive torque to front wheels 34, torque coupling 330 is shown operably disposed between drive shaft 350 and transfer shaft 344. In particular, transfer clutch 50 is arranged such that drum 88 is driven with ring gear 346 by drive shaft 350. As such, clutch actuator 52 functions to transfer drive torque from drum 88 through clutch pack 90 to hub 84 which, in turn, drives carrier 338 of differential unit 38' via transfer shaft 344.

Figure 14:
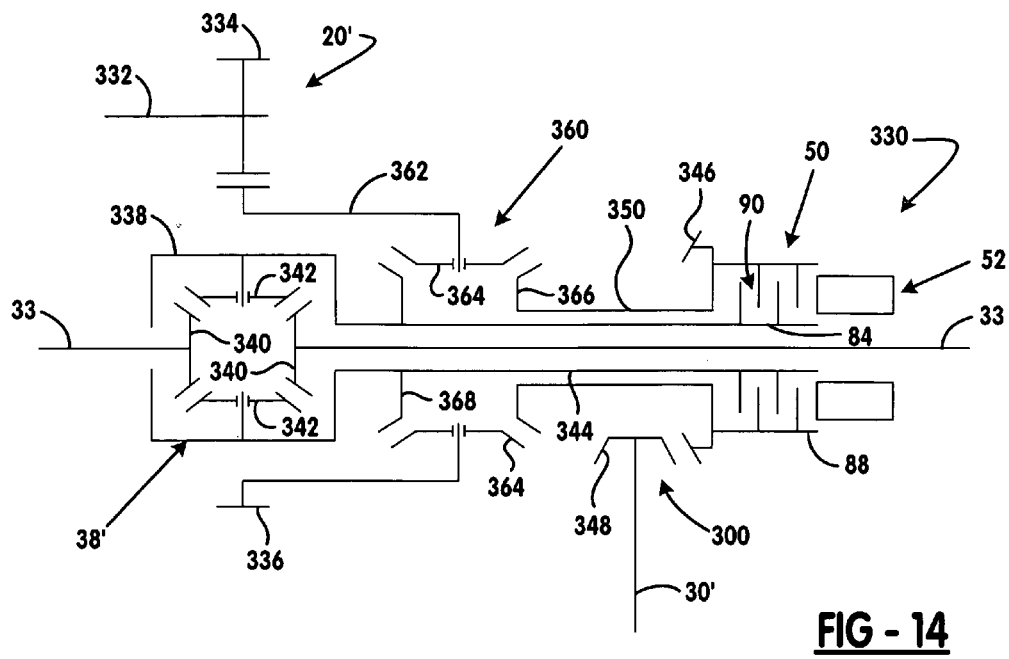

In addition to the on-demand four-wheel drive systems shown previously, the power transmission technology of the present invention can likewise be used in full-time four-wheel drive systems to adaptively bias the torque distribution transmitted by a center or "interaxle" differential unit to the front and rear drivelines. For example, FIG. 14 schematically illustrates a full-time four-wheel drive system which is generally similar to the on-demand four-wheel drive system shown in FIG. 13 with the exception that an interaxle differential unit 360 is now operably installed between carrier 338 of front differential unit 38' and transfer shaft 344. In particular, output gear 336 is fixed for rotation with a carrier 362 of interaxle differential 360 from which pinion gears 364 are rotatably supported. A first side gear 366 is meshed with pinion gears 364 and is fixed for rotation with drive shaft 350 so as to be drivingly interconnected to the rear driveline through power transfer unit 300. Likewise, a second side gear 368 is meshed with pinion gears 364 and is fixed for rotation with carrier 338 of front differential unit 38' so as to be drivingly interconnected to the front driveline. Torque transfer mechanism 330 is now shown to be operably disposed between side gears 366 and 368. Torque transfer mechanism 330 is operably arranged between the driven outputs of interaxle differential 360 for providing an adaptive torque biasing and slip limiting function.

Figure 15:
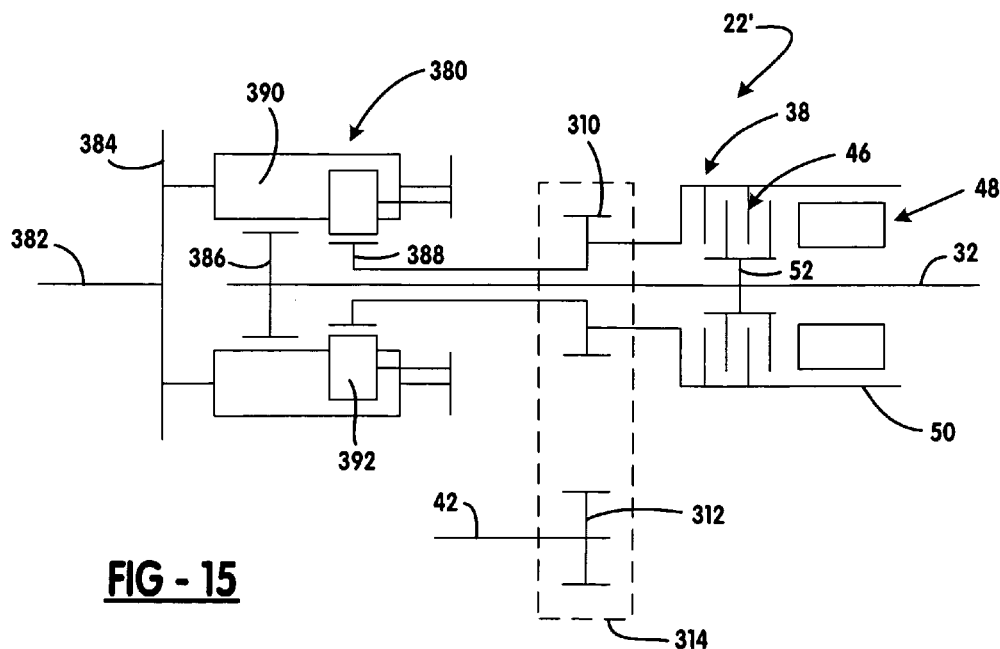
FIG. 15 is a schematic illustration of an alternative construction for the power transmission device shown in FIG. 2.

Referring now to FIG. 15, a full-time 4WD system is shown to include a transfer case 22' which is generally similar to transfer case 22 of FIG. 2 except that an interaxle differential 380 is provided between an input shaft 382 and output shafts 32 and 42. As is conventional, input shaft 382 is driven by the output of transmission 20. Differential 380 includes an input defined as a planet carrier 384, a first output defined as a first sun gear 386, a second output defined as a second sun gear 388, and a gearset for permitting speed differentiation between first and second sun gears 386 and 388. The gearset includes a plurality of meshed pairs of first planet gears 390 and second pinions 392 which are rotatably supported by carrier 384. First planet gears 390 are shown to mesh with first sun gear 386 while second planet gears 392 are meshed with second sun gear 388. First sun gear 386 is fixed for rotation with rear output shaft 32 so as to transmit drive torque to the rear driveline. To transmit drive torque to the front driveline, second sun gear 388 is coupled to transfer assembly 100 which again includes first sprocket 102 rotatably supported on rear output shaft 32, second sprocket 106 fixed to front output shaft 42, and power chain 110.

The present invention relates to use of an actively-controlled torque transfer device in motor vehicle applications. In summary, the electrohydraulic pump supplies the rotary operator unit with pressurized fluid. The indexing component of the rotary operator is splined to one member of the ball ramp unit such that it operates to energize the ball ramp unit for engaging the friction clutch and causing drive torque to be transferred. Use of the ball ramp unit provides an amplification factor and allows the hydraulic system to operate at a relatively low line pressure. Thus, the drive torque transferred across the friction clutch can be modulated while the excess fluid is directed to a low pressure cooling circuit to cool/lubricate the friction clutch.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
a first rotary member;
a second rotary member;
a torque transfer mechanism operable for transferring drive torque between said first and second members, said torque transfer mechanism having a transfer clutch disposed between said first and second rotary members, a rotary operator and a thrust mechanism for applying a clutch engagement force to said transfer clutch, said transfer clutch including a hub driven by said first rotary member, a drum driven by said second rotary member and a clutch pack operably disposed between said hub and said drum, said rotary operator including a first component rotatably driven by said hub and a second component aligned with said first component so as to define an actuation chamber therebetween, said second component is adapted to rotate relative to said first component in response to fluid pressure in said actuation chamber, said thrust mechanism is operable to apply said clutch engagement force to said clutch pack in response to rotation of said second component relative to said first component; and
a hydraulic control system for regulating the fluid pressure supplied to said actuation chamber.

2. The power transmission device of claim 1 wherein said hydraulic control system includes a control valve disposed in a hydraulic circuit for regulating the fluid pressure supplied to said actuation chamber.

3. The power transmission device of claim 1 wherein angular movement of said second component to a low pressure position relative to said first component causes said thrust mechanism to apply a minimum clutch actuation force to said transfer clutch, wherein angular movement of said second component to a high pressure position relative to said first component causes said thrust mechanism to apply a maximum clutch actuation force to said transfer clutch, and wherein said second component is moveable between its low pressure and high pressure positions due to the magnitude of the fluid pressure delivered by said hydraulic control system to said actuation chamber.

4. The power transmission device of claim 1 wherein said first component of said rotary operator is a first ring having a plurality of first lugs so as to define a plurality of channels therebetween, and wherein said second component of said rotary actuator is an a second ring having a plurality of second lugs which extend into said channels so as to define a series of said actuation chambers between adjacent pairs of said first and second lugs.

5. The power transmission device of claim 4 wherein said second ring is concentrically aligned with said first ring such that said first lugs extend radially outwardly from said first ring and said second lugs extend radially inwardly from said second ring.

6. The power transmission device of claim 1 wherein said second component engages said thrust mechanism such that rotation of said second component results in translational movement of said thrust mechanism for controlling the magnitude of said clutch actuation force applied to said transfer clutch.

7. The power transmission device of claim 6 wherein said thrust mechanism includes a first cam member driven by said second component and a second cam member operable to move axially for applying said clutch engagement force to said clutch pack in response to rotation of said first cam member.

8. The power transmission device of claim 7 wherein an increase in fluid pressure in said actuation chamber causes said second component and said first cam member to rotate in a first direction relative to said first component for causing corresponding axial movement of said second cam member from a first position toward a second position relative to said transfer clutch, and wherein a decrease in fluid pressure in said actuation chamber causes said second component and said first cam member to rotate in a second direction relative to said first component for causing movement of said second cam member toward its first position.

9. The power transmission device of claim 1 wherein said first rotary member is a first shaft in a transfer case and said second rotary member is a second shaft of said transfer case.

10. The power transmission device of claim 1 wherein said first rotary member is driven by a powertrain of a motor vehicle and said second rotary member is connected to a differential unit of a drive axle assembly.

11. A power transfer device for use in a motor vehicle having a powertrain and first and second drivelines, comprising:
a first shaft driven by the powertrain and adapted for connection to the first driveline;
a second shaft adapted for connection to the second driveline;
a torque transmission mechanism for transferring drive torque from said first shaft to said second shaft, said torque transmission mechanism including a transfer clutch operably disposed between said first shaft and said second shaft and a clutch actuator for engaging said transfer clutch, said transfer clutch including a first clutch member driven by said first shaft, a second clutch member driven by said second shaft and a clutch pack operably disposed between said first and second clutch members, said clutch actuator includes a rotary operator and a thrust mechanism, said rotary operator having first and second components which define an actuation chamber that is adapted to receive pressurized fluid, said first component is fixed for rotation with one of said first and second clutch members and said second component is adapted to rotate relative to said first component in response to the pressurized fluid in said actuation chamber, said thrust mechanism is operable for applying a clutch actuation force to said clutch pack in response to rotation of said second component relative to said first component; and
a control system for regulating the pressurized fluid supplied to said actuation chamber.

12. The power transfer device of claim 11 wherein angular movement of said second component to a low pressure position relative to said first component causes said thrust mechanism to be located in a first position for causing a minimum clutch engagement force to be applied to said clutch pack, wherein angular movement of said second component to a high pressure position relative to said first component causes said thrust mechanism to move to a second position for causing a maximum clutch engagement force to be applied to said clutch pack, and wherein said second component is moveable between its low pressure and high pressure positions due to the magnitude of the pressurized fluid delivered by said hydraulic control system to said actuation chamber.

13. The power transfer device of claim 12 wherein said first component of said rotary operator is a first ring having a first body segment and a plurality of first lugs which define a series of channels therebetween, wherein said second component is a second ring having a second body segment and a plurality of second lugs which extend into said channels so as to define a plurality of said actuation chambers between said first and second lugs, and wherein said actuator chambers are in fluid communication with a control valve such that selective control of said control valve results in rotary movement of said second ring relative to said first ring.

14. The power transfer device of claim 13 wherein rotation of said second ring causes movement of said thrust mechanism for exerting said clutch actuation force on said clutch pack.

15. The power transfer device of claim 13 wherein said thrust mechanism includes a first cam member coupled for rotation with said first ring which operates to cause translational movement of a second cam member relative to said clutch pack in response to rotary movement of said first cam member.

16. A power transfer device for use in a motor vehicle having a powertrain and first and second drivelines, comprising:
an input member adapted to receive drive torque from said powertrain;
a first output member adapted to provide drive torque to the first driveline;
a second output member adapted to provide drive torque to the second driveline;
a gearset operably interconnecting said input member to said first and second output members;
a torque transmission mechanism for limiting speed differentiation between said first and second output members, said torque transmission mechanism including a transfer clutch operably disposed between any two of said input member and said first and second output members and a rotary operator for controlling engagement of said transfer clutch, said rotary operator having first and second components defining an actuation chamber therebetween that is adapted to receive pressurized fluid, said first component is fixed for rotation with one of said input and output members and said second component is adapted to rotate relative to said first component in response to the pressurized fluid in said actuation chamber for causing a clutch actuation force to be applied to said transfer clutch, and
a hydraulic control system for regulating the pressurized fluid supplied to said actuation chamber.

17. The power transfer device of claim 16 wherein rotation of said second component to a first position relative to said first component causes a thrust mechanism to be located in a first position for applying a minimum actuation force to said transfer clutch, wherein rotation of said second component to a second position relative to said first component causes said thrust mechanism to move to a second position for applying a maximum actuation force to said transfer clutch, and wherein said second component is rotated between its first and second positions in response to the magnitude of the pressurized fluid delivered to said actuation chamber.

18. The power transfer device of claim 16 wherein said first component of said rotary operator is a reaction ring having a plurality of first lugs which define a series of channels therebetween, and said second component is an actuator ring having a plurality of second lugs which extend into said channels so as to define a plurality of said actuation chambers between said first and second lugs, wherein said actuator chambers are in fluid communication with a variable pressure fluid source operable for controlling rotary movement of said actuator ring relative to said reaction ring.

19. The power transfer device of claim 18 wherein said actuator ring is fixed to a drive component of a thrust mechanism such that rotation of said drive component results in movement of a driven component of said thrust mechanism relative to said transfer clutch for controlling the magnitude of said clutch actuation force applied to said transfer clutch.

20. The power transfer device of claim 19 wherein an increase in pressure of the pressurized fluid in said actuation chambers causes said actuator ring and said drive component to rotate in a first direction relative to said reaction ring for causing said driven component to move from a retracted position toward an extended position relative to said transfer clutch, and wherein a decrease in pressure of the pressurized fluid in said actuation chambers causes said actuator ring and said drive component to rotate in a second direction relative to said reaction ring for causing said driven component to move toward its retracted position.

21. A torque transfer mechanism for controlling transfer of drive torque between first and second rotary members comprising:
　a transfer clutch operably disposed between the first and second rotary members;
　a rotary clutch operator having first and second components defining an actuation chamber therebetween;
　a ball ramp unit operably disposed between said second component of said rotary clutch operator and said transfer clutch; and
　a hydraulic control system operable for controlling fluid pressure delivered to said actuation chamber so as to control angular movement of said second component relative to said first component for controlling the magnitude of a clutch engagement force applied by said ball ramp unit to said transfer clutch.

22. The power transmission device of claim 21 wherein angular movement of said second component to a first position relative to said first component causes said ball ramp unit to apply a minimum clutch actuation force to said transfer clutch, wherein angular movement of said second component to a second position relative to said first component causes said ball ramp unit to apply a maximum clutch actuation force to said transfer clutch, and wherein said second component is moveable between its first and second positions due to the magnitude of the fluid pressure delivered by said hydraulic control system to said actuation chambers.

23. The power transmission device of claim 21 wherein said first component is fixed to a first cam member of said ball ramp unit such that rotation of said first cam member results in translational movement of a second cam member of said ball ramp unit for controlling the magnitude of said clutch actuation force applied to said transfer clutch.

24. The power transmission device of claim 21 wherein the first rotary member is a first shaft in a transfer case and the second rotary member is a second shaft of said transfer case.

25. The power transmission device of claim 21 wherein the first rotary member is driven by a powertrain of a motor vehicle and the second rotary member is connected to a differential unit of a drive axle assembly.

* * * * *